UNITED STATES PATENT OFFICE.

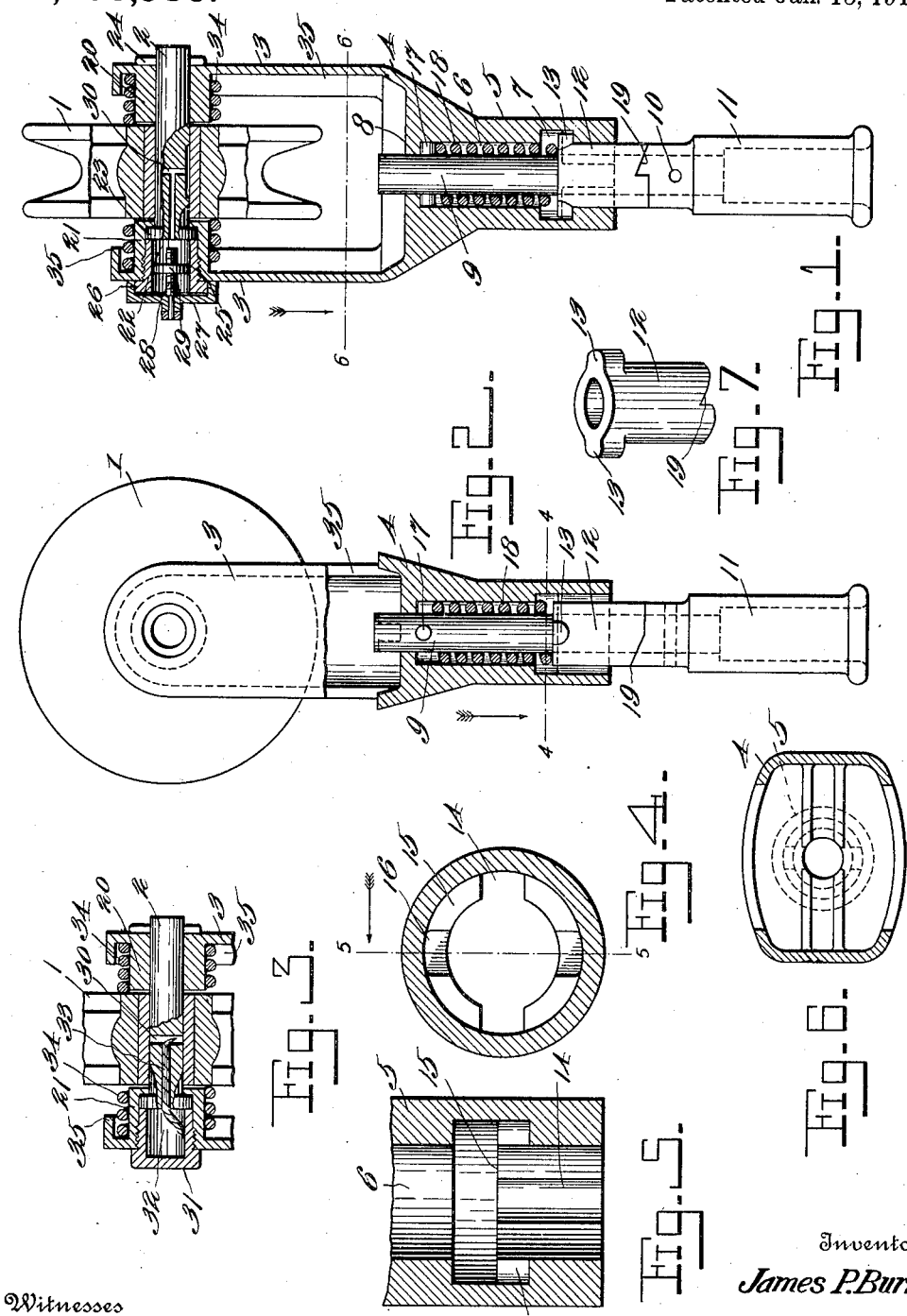

JAMES P. BURNS, OF AUBURN, NEW YORK.

TROLLEY-WHEEL.

1,083,986.  Specification of Letters Patent.  Patented Jan. 13, 1914.

Application filed May 29, 1912. Serial No. 700,505.

*To all whom it may concern:*

Be it known that I, JAMES P. BURNS, a citizen of the United States, residing at Auburn, in the county of Cayuga and State of New York, have invented certain new and useful Improvements in Trolley-Wheels, of which the following is a specification.

The present invention relates to trolley wheels and consists in the combinations and arrangements of parts hereinafter described and set forth in the accompanying claims.

The invention has for its purpose to provide a trolley wheel having a novel form of changeable harp whereby the same may be readily applied to or removed from position, and which when in position will stay rigidly secured to withstand all the uses to which the appliance is subjected.

The invention further contemplates a novel form of lubricator for the trolley wheel whereby to obtain easier running thereof and better service generally.

In addition to the foregoing stated advantages the invention embodies other points of merit which will be apparent from the accompanying description.

The invention is shown by way of illustration in the appended drawings wherein:

Figure 1 is a partly front elevation and central sectional view of the device complete. Fig. 2 is a similar view taken at right angles to Fig. 1. Fig. 3 is a central sectional view of a modified construction of lubricator. Fig. 4 is a transverse sectional view of Fig. 2 taken on the line 4—4 thereof. Fig. 5 is a central sectional view taken on the line 5—5 of Fig. 4. Fig. 6 is a transverse sectional view taken on the line 6—6 of Fig. 1; and Fig. 7 is a detail perspective view of the locking collar.

Referring to the construction in further detail and wherein like reference characters indicate corresponding parts in the different views shown 1 indicates the trolley wheel journaled on the axle 2 that is carried by the arms 3 of the harp 4; said harp 4 is constructed with a downwardly disposed neck 5 having a central opening 6 which is enlarged as at 7 and constricted at the upper end 8 to receive the harp supporting shaft 9, with which it has rigid and detachable connection.

The shaft 9 is secured by a pin 10 to a head 11 which latter is adapted to be mounted on the end of the trolley arm carried by the car. A collar 12 is slidably mounted on the shaft 9 and is provided on its upper end with a pair of oppositely disposed lugs 13. The lugs 13 are adapted to be inserted within the enlarged opening 7 through the medium of suitable channels 14 (see Figs. 4 and 5). The channel-ways 14 divide the neck portion below the opening 7 to provide a pair of shoulders or ledges 15 within each of which there is formed a recess or depression 16, said recesses 16 are located at right angles relatively to the channel-ways 14 as shown in Fig. 4. The lugs 13 of the collar 12 are designed to seat within the recesses 16, and project slightly above the surfaces of the ledges 15, as in that manner indicated in Fig. 2, and which is the locking position of the collar as will be now further explained.

The shaft 9 is provided near its upper end with a cross pin 17 which limits the extent of movement of the shaft through the constricted opening 8. A spiral spring 18 is mounted on the shaft 9 between said cross pin 17 and the collar 12 and through the tension of said spring said collar is kept rigidly seated with its lugs 13 in the depressions 16, as illustrated in Figs. 1 and 2. The adjacent faces of the head 11 and the collar 12 are constructed with complementary cam surfaces 19 to the end that the collar 12 is prevented from turning in one direction but permitted to turn in the opposite direction; and when turned in said opposite direction the collar 12 will be lifted whereby the lugs 13 will move clear of the notches 16. When the lugs 13 are brought into register with the channel-ways 14 the shaft 9, head 11 and collar 12 may then be disconnected from the harp.

With the foregoing described arrangement it will be readily seen that the harp shown herein may be readily applied to or removed from position on the supporting shaft 9, or that another harp of like dimensions but carrying a larger wheel may be substituted.

The arms 3 of the harp 4 are provided respectively with inwardly disposed bosses 20 and 21 of which the latter provides a lubricating chamber 22. The axle 2 is mounted on said bosses 20 and 21 and has a head 23 on one end located within said lubricating chamber and its free end projecting through the boss 20 and secured by a cotter pin 24. A tubular collar 25 is screw threaded within the boss 21 and has an annular flange 26 secured to a cap 27. A stub screw shaft 28 is secured to the cap 27 and has adjustable thereon a follower 29 through the movement of which the lubricant within the chamber 22 is forced through the ducts 30 to lubricate the bearing of the wheel 1, as will be understood.

The modified construction of lubricator illustrated in Fig. 3 is in all respects similar to that disclosed in Fig. 1 with the exception that a closed cap 31 is mounted on the boss 21 and provides the lubricating chamber 32. And a wick 33 conducts the lubricant from the chamber 32 through the oiling ducts 30 as required.

In each of the constructions illustrated in Figs. 1 and 3 the trolley wheel 1 is centered with respect to the bosses 20 and 21 through the medium of coil springs 34 of which there is one mounted on each of said bosses and having light frictional engagement with the adjacent side of the wheel 1. The sides of the arms 3 of the harp are constructed with a continuous flange 35 which in addition to providing reinforcements for said arms do further provide retaining elements for the springs 34 as shown.

While I have shown and described a preferred embodiment of the idea, it is to be understood that the invention is not limited to the details of construction disclosed since various changes may be made in the parts and arrangements thereof without departing from the invention as set forth in the claims.

What is claimed as new and desired to protect by United States Letters Patent is:

1. A device of the character described comprising a harp having a neck portion and a central opening therethrough; and trolley wheel mounted on said harp; a shaft passing through said central opening; a collar slidably mounted on said shaft and adapted for locking engagement with the harp within said opening; and a spring mounted on said shaft for holding the collar in locking position, substantially as described.

2. A device of the character described comprising a harp having a neck portion, said neck portion provided with a central opening having an enlargement thereon; a trolley wheel mounted on said harp; a shaft projecting through said central opening; a head secured to said shaft; a collar slidably mounted on said shaft and provided with lugs, said lugs adapted to seat within said opening enlargement; a spring mounted on said shaft within said central opening and acting against said collar to seat said lugs; and said collar and head having complementary cam surfaces whereby said collar will be lifted to remove the lugs from seating position whereby to remove the harp, substantially as described.

In testimony whereof I affix my signature in presence of two witnesses.

JAMES P. BURNS.

Witnesses:
C. H. KESSLER,
WM. H. McCABE.